United States Patent
Maggenti (10) Patent No.: US 6,301,263 B1
(45) Date of Patent: Oct. 9, 2001

(54) METHOD AND APPARATUS FOR PROVIDING FAIR ACCESS IN A GROUP COMMUNICATION SYSTEM IN WHICH USERS EXPERIENCE DIFFERING SIGNALING DELAYS

(75) Inventor: Mark Maggenti, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/275,698

(22) Filed: Mar. 24, 1999

(51) Int. Cl.$^7$ .................................................. H04J 3/02
(52) U.S. Cl. ............................................. 370/462; 455/518
(58) Field of Search ....................................... 370/462, 316, 370/319, 328, 338, 341, 329, 348, 522, 461, 447; 455/404, 415, 427, 405, 519, 500, 518

(56) References Cited

U.S. PATENT DOCUMENTS

| | | | |
|---|---|---|---|
| 4,723,264 | * | 2/1988 | Sasult et al. .......................... 455/410 |
| 5,131,038 | * | 7/1992 | Puhl et al. ........................... 340/5.61 |
| 5,487,170 | * | 1/1996 | Bass et al. ........................... 710/244 |
| 5,511,232 | * | 4/1996 | O'Dea et al. .......................... 455/88 |
| 5,649,206 | * | 7/1997 | Allen .................................... 370/462 |
| 5,790,527 | * | 8/1998 | Janky et al. .......................... 370/330 |
| 5,930,295 | * | 7/1999 | Isley, Jr. et al. ..................... 375/219 |
| 6,041,226 | * | 3/2000 | Skoro, III et al. ................... 455/405 |

\* cited by examiner

Primary Examiner—Dang Ton
Assistant Examiner—Phirin Sam
(74) Attorney, Agent, or Firm—Philip R. Wadsworth; Gregory D. Ogrod; Thomas M. Thibault (57) ABSTRACT

A method and apparatus for providing fair access to members of a group communication system in which the members experience differing signaling delays. Members of the communication system send a transmission request to an arbitration device when they wish to communicate with other members. The transmission requests are ultimately received by the arbitration device. A time window is opened by a processor located at the arbitration device at the time an initial transmission request is received. The time window is used to treat all transmission requests that are received within the time window as having been received at the same time. Any transmission requests that are received within the time window are included in determining which member should be granted an exclusive transmission privilege.

6 Claims, 5 Drawing Sheets

METHOD AND APPARATUS FOR PROVIDING FAIR ACCESS IN A GROUP COMMUNICATION SYSTEM IN WHICH USERS EXPERIENCE DIFFERING SIGNALING DELAYS

BACKGROUND OF THE INVENTION

I. Field of the Invention

The present invention relates generally to push-to-talk communication systems and more particularly to a method and apparatus for providing fair access to members of a push-to-talk communication system in which the members experience differing signaling delays.

II. Description of the Related Art

Point-to-multipoint communication systems have been used for many years to provide communications generally between a central location and multiple users of the system. For example, dispatch systems using Land Mobile Radios (LMRs) have been used in trucks, taxis, buses, and other vehicles in order to communicate scheduling information between a central dispatch center and one or more corresponding fleet vehicles. Communications may be directed at a specific vehicle in the fleet or to all vehicles simultaneously.

Another example of a point-to-multipoint communication system is a push-to-talk communication system. Such a system allows a group of individuals, each having a wireless communication device, to communicate with other members of the group. Typically, a push-to-talk system relies on a single frequency, or dedicated channel, over which communications are received by the wireless communication devices. Only one member may transmit information to the other members at a time. However, all members can listen to a dedicated broadcast channel to receive communications from the single member who is transmitting. Members desiring to communicate with other members of the system typically depress a push-to-talk button on their respective communication devices which allows them sole access to the dedicated channel. Hence, these systems are known as push-to-talk communication systems.

Push-to-talk systems are typically used in outdoor settings where a group of people, or members, require communications with each other in a "point-to-multipoint" fashion. Examples of push-to-talk system uses include workgroup communications, security communications, construction site communication, and localized military communications. The group of people requiring communications with each other is commonly known as a "net," each member of the net sometimes referred to as a "net member," or simply a "member."

In a typical push-to-talk system, a dedicated channel, sometimes referred to as a broadcast channel, is used to transmit communications from one member to multiple other members of the net simultaneously. The broadcast channel may comprise a single channel or frequency, or a group of individual channels managed by a controller to imitate the single channel. In either case, only one member may transmit voice and/or data communications to the other member users at any given time. If another member attempts to transmit voice and/or data over the broadcast channel while another member is transmitting, interference between the two competing communications will occur, resulting in non-intelligible voice and/or data being received by the other net members.

To prevent interference between members, many push-to-talk systems use an arbitration device to limit access to the broadcast channel to only one net member at any given time. Typically, the arbitration device is located at a central facility, base station, or other communication facility where communications between net members pass. The arbitration device typically comprises a digital computer which monitors transmissions from members for a transmission request message. The transmission request message is typically generated upon a net member depressing a push-to-talk button, located on the wireless communication device. The transmission request is transmitted from the wireless communication device to the arbitration device prior to a net member commencing transmissions.

In practice, members generally listen to communications over the dedicated channel and attempt to transmit when there is a moment of silence in the communications, for example, when a net member has finished transmitting. At that time, the member wishing to transmit generally presses and holds a push-to-talk button located on his or her communication device. If the requesting member is granted transmission privileges by the arbitration device, he or she may begin transmitting communications to other members belonging to the broadcast communication system.

Generally, the arbitration device will grant transmission privileges to a requesting member only if no other member is presently using the broadcast channel. In other systems, a priority scheme is used to decide who is given transmission privileges when another member currently possesses the transmission privilege.

In another situation, two or more transmission requests from two or more communication devices are received by the arbitration device at or substantially the same time. In this case, the arbitration device decides which of the requests is granted transmission privileges, assuming that no other member is currently transmitting.

One problem with such an arbitration arrangement is that members who experience large signaling delays between when a transmission request is generated and when the transmission request is received by the arbitration device will have a smaller chance of being granted the transmission privilege. Such a problem might be common for a member who is operating a satellite communication device, for example. In that case, such a member may try to gain access to the communication system by pressing a push-to-talk button on his or her satellite communication device after a broadcast by another member has ceased. However, by the time the transmission request is received by the arbitration device, other members who are operating within a closer proximity to the arbitration device, generally using a terrestrial communication system, will most likely have their transmission requests received at an earlier time than the satellite member's request. Because many arbitration devices award transmission privileges on a "first come, first served" basis, the satellite member may not be able to compete fairly with other members for the opportunity to speak.

What is needed is an arbitration device that will allow members who experience large signaling delays in transmitting transmission requests to improve their chances of obtaining transmission privileges.

SUMMARY OF THE INVENTION

The present invention is a method and apparatus for providing fair access to members of a group communication system in which the members experience differing signaling delays. In such a group system, only one member is allowed to transmit information to other members at any given time.

This is achieved by granting an exclusive transmission privilege to one member at a time by an arbitration device.

Members of the communication system send a transmission request to the arbitration device when they wish to communicate with other members. Information associated with each transmission request, such as identification information, is stored in a memory, generally located at the arbitration device. Upon receipt of an initial transmission request, a time window is opened by a processor located at the arbitration device at or near the time the initial transmission request is received. The time window is used to treat all transmission requests that are received within the time window as having been received at the same time. Any transmission requests that are received within the time window are included in determining which member should be granted an exclusive transmission privilege.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is described herein with respect to a wireless push-to-talk communication system comprising a wireless terrestrial-based communication system and a satellite communication system. Although the teachings of the present invention are described with respect to a wireless push-to-talk system, it should be understood that the present invention can be used with a wireline communication system, or a combination of a wireless and a wireline system, as well. In addition, the present invention can be used in a variety of non-telephonic applications, including Land Mobile Radio (LMR) systems, walkie-talkies, or a data communications network. Furthermore, it should be understood that the present invention is applicable to both voice and data applications.

Figure 1:
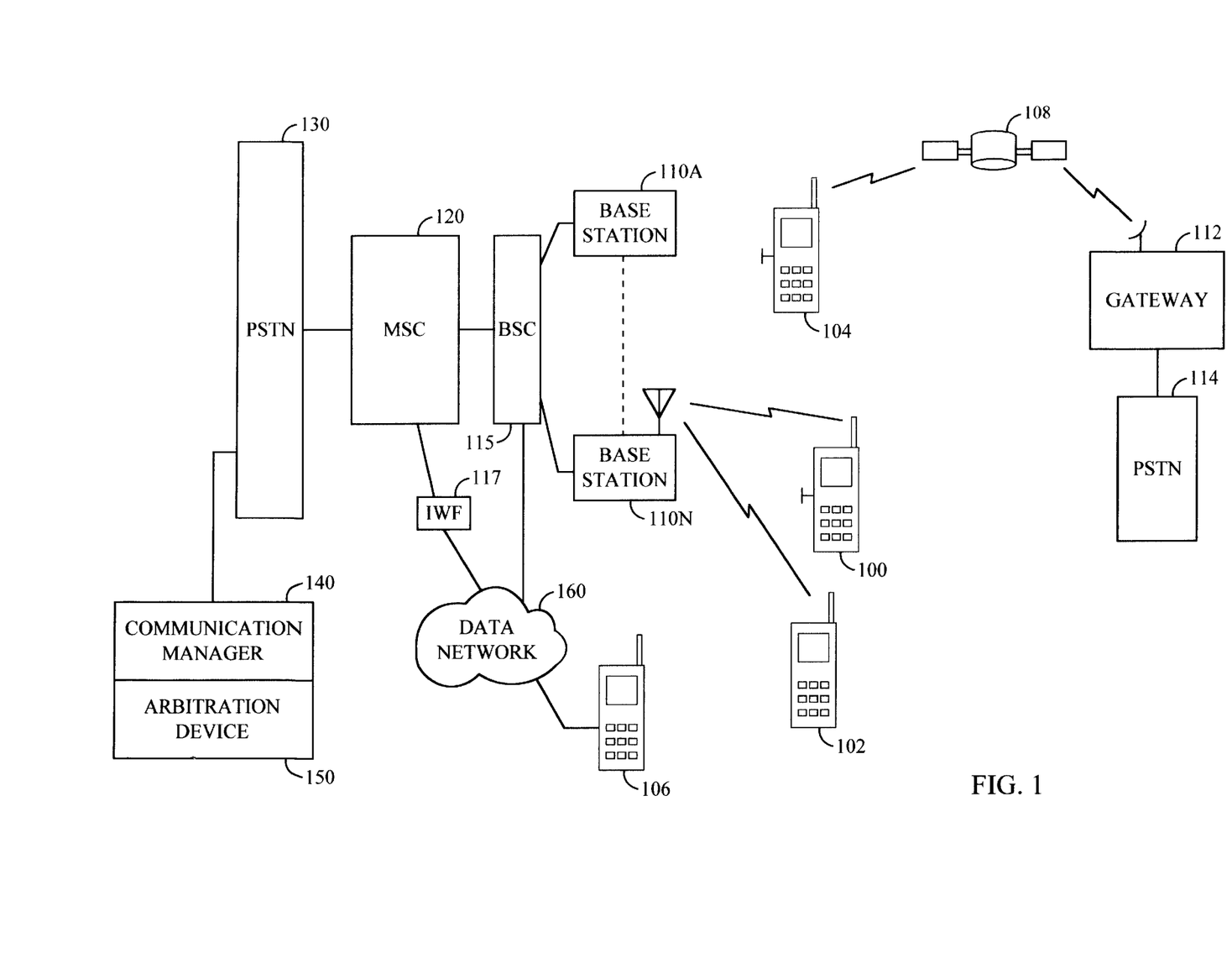
FIG. 1 is an illustration of a group communication system in which the present invention is used.

FIG. 1 is an illustration of a wireless push-to-talk communication system, otherwise known as a group communication system, a net broadcast system, a dispatch system, or a point-to-multipoint communication system. It should be understood that the components shown in FIG. 1 are merely representative of one type of wireless communication system and that other communication systems may use different components in order to achieve similar results. The present invention, therefore, is not intended to be limited to the system shown in FIG. 1. In addition, the present invention is not intended to be limited to a wireless communication system. The principles described herein with respect to the invention apply equally to a wireline push-to-talk system, or a hybrid system comprising both wireline and wireless communication devices, as well.

In the group communication system of FIG. 1, net members communicate with one another using a wireless communication device assigned to each member of the system. The term "net" denotes a group of member users, each authorized to communicate with each other within a communication system. Generally, a central database contains information identifying the members of the particular net. More than one net may operate in the same communication system. For instance, a first net may be defined having ten members and a second net may be defined, having 20 members. The ten members of the first net can communicate with each other, but generally not to members of the second net. In other situations, members of different nets are able to monitor communications between members of more than one net, but are only able to transmit information to members within their own net.

The wireless communication devices, or remote units, are shown in FIG. 1 as remote units 100, 102, 104, and 106, a single remote unit being assigned to each net member. Although only four remote units are shown in FIG. 1, it should be understood that a push-to-talk system may have as few as two remote units or as many as one hundred remote units or more. As shown in FIG. 1, wireless communication devices 100 and 102 represent terrestrial-based wireless communication devices, while remote unit 104 represents a satellite-based communication device and remote unit 106 represents a data communication device connected to data network 160.

Referring again to FIG. 1, communications from remote units 100 and 102 are transmitted to and from base stations 110a through 110n, representing one through "n" base stations comprising a wireless, terrestrial-based communication system. Base stations are well known in the art for relaying wireless communication signals among remote units and between remote units and a central facility, such as mobile switching center (MSC) 120. Communications between MSC 120 and base stations are routed through one or more base station controllers, one of which is shown as base station controller (BSC) 115. BSC 115 coordinates the functionality of typically several base stations operating in a given location.

Each base station 110 provides a coverage area ranging up to several miles in radius from the base station location. As remote units travel within the coverage area of each base station, communication signals to be transferred to and from the remote unit are routed generally through the particular base station to which the remote unit is most closely located.

A defining characteristic of traditional push-to-talk systems is that only one member may transmit information to other members at a time. This avoids multiple communications from occurring simultaneously, which would result in unintelligible voice and data being received by net members. In many push-to-talk communication systems, a single frequency, or channel, is generally used by all remote units for transmissions and receptions. Consider, for example, a simple push-to-talk system using walkie-talkies. In such a system, the walkie-talkies communicate directly with each other without the need for a base station or other central communication manager. A dedicated channel is used for both transmissions and receptions, the transmissions and receptions occupying different time slots in the dedicated channel. If the dedicated channel is being used by a first user, any other user wishing to transmit must wait until the first user is finished transmitting. Otherwise, interference will result between the two users who are transmitting substantially simultaneously.

In a more sophisticated push-to-talk system, such as the one shown in FIG. 1, members communicate with each other via one or more base stations, rather than directly with one another. An arbitration device is often used in these sophisticated systems to allow only one member to transmit to other members at any given time. The concept of a dedicated channel for transmission and reception may also be different in such a system. For example, the "broadcast channel" in such a system is simply the concept of allowing only a single member to communicate to other members, rather than a dedicated frequency over which to transmit.

For example, in an exemplary Code Division Multiple Access (CDMA) system, each member communicates with one or more base stations, each member using a unique modulation code to differentiate transmissions and reception from each other. Typically, each member establishes a forward link and a reverse link with one or more base stations, the former used to describe a channel from a base station to a remote unit, the latter used to describe a channel from a remote unit to a base station. When a member wishes to transmit a message to other members of the net, the message is sent over a reverse link, unique to the transmitting remote unit, to a base station. The message is then retransmitted to each of the other members over multiple forward links, one forward link for each member in the net, or alternatively, the message is transmitted over a single forward link which is monitored by all members. If two or more members try to transmit simultaneously to the other members, an arbitration device selects only one of the transmissions to be retransmitted to the other members.

Referring back to FIG. 1, MSC 120 provides circuitry for routing communications between remote units operating in various base station coverage areas, as well as between remote stations and land-line telephone users through a Public Switch Telephone Network, shown in FIG. 1 as PSTN 130. MSC 120 may, alternatively, or in addition to, be connected to computer network 160 to provide communications between remote units in the communication system and various known computing devices connected to computer network 160, such as personal computers, mainframe computers, digital cameras, email systems, remotely controlled devices, and so on. Typically, the connection from MSC 120 to computer network 160 is made using an inter-working function, or IWF 117. IWF 117 formats data from MSC 120 using protocols suitable for use with computer network 160, generally the well-known TCP/IP protocol. Alternatively, a connection to computer network 160 may be made directly by BSC 115 without the need for a discrete IWF 117. In this case, the formatting function of IWF 117 is built into BSC 115.

A communications manager 140 may be connected to PSTN 130, as shown in FIG. 1, or to data network 160 to provide push-to-talk communications in an existing point-to-point wireless communication system. Communications manager 140 provides a traffic controller (described later) which is used to enable one net member to simultaneously communicate with other net members when broadcast communications are desired. In addition, an arbitration device 150 may also reside at communications manager 140, which controls which member is granted an exclusive privilege to transmit to other net members. This exclusive privilege is sometimes referred to as an exclusive transmission privilege, or simply a transmission privilege, and is generally only granted to one net member at a time. An example of a communications manager operating in an existing wireless communication system is disclosed by U.S. patent application Ser. No. 08/595,566 entitled "Method and Apparatus for Providing a Private Communication System in a Public Switched Telephone Network," assigned to the assignee of the present invention and incorporated by reference herein.

Arbitration device 150 can be located at communications manager 140, or it can be located at MSC 120, or at any one of base stations 110a through 110n. It may also be connected to a data network 160, for receiving communication signals in the form of data packets. An example of data network 160 is the Internet, in which data is exchanged between computers using predefined protocols, such as the well known TCP/IP protocol. Communications to and from remote units are converted into data packets suitable for transmission over data network 160. Members can connect a communication device, such as a telephone or a computer, to data network 160 and communicate with other members. The primary function of arbitration device 150 is to assign the exclusive transmission privilege to one member at a time.

Figure 2:
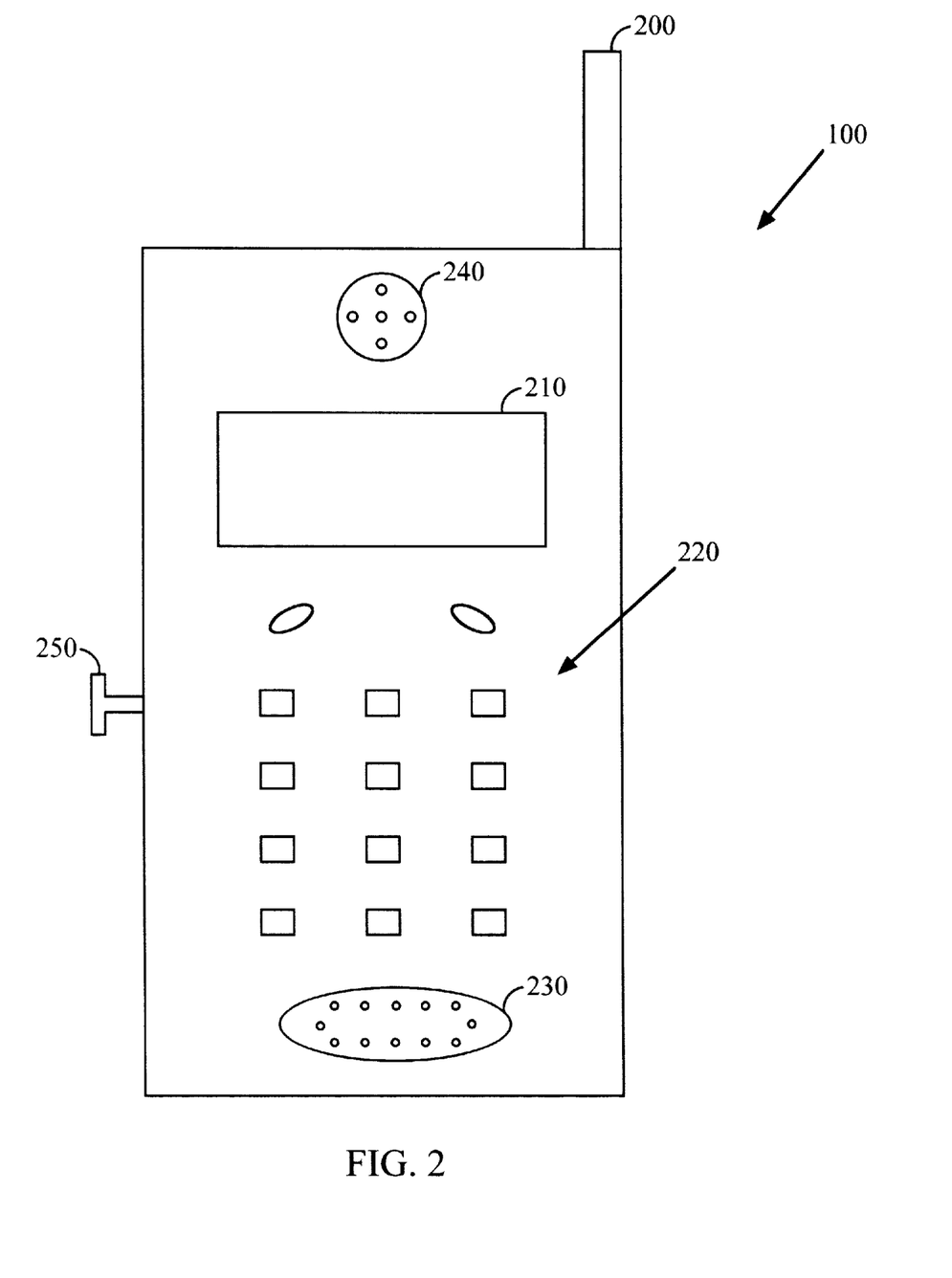
FIG. 2 illustrates a typical remote unit used in the group system of FIG. 1.

FIG. 2 illustrates a typical remote unit 100 comprising an antenna 200, a display 210, keys 220, a speaker 230, an earpiece 240, and a push-to-talk switch 250. For purposes of discussion, the remote unit of FIG. 2 is a wireless, terrestrial based remote unit 100, although it should be understood that the same description applies to the other mentioned remote unit types. Remote unit 100 may be a wireless telephone employing one or more digital and/or analog technologies, a Land Mobile Radio (LMR), a walkie-talkie, a data computing device, a satellite communication device, or any device which allows wireless communications to take place between remote unit 100 and a remote destination. Typically, remote unit 100 is used to transmit and receive voice communications between net members. In addition, remote unit 100 may also have the ability to provide point-to-point communications to other wireless or wireline users of the communication system using either a wireless or a wireline communication device, or to a communication device not associated with the group of members operating in the particular net.

In addition to voice communications, remote unit 100 may also be equipped to transmit and receive data communications by integration with any data processing device such as a portable or fixed computer system, a position reporting system, or a meter reading system. Remote unit 100 may interface to such a data-generating device using an interface cable, having one end of the interface cable connected to the data processing device and the other end connected to a communication port (not shown) on remote unit 100. Alternatively, the necessary internal components of remote unit 100 may be integrated into the data processing device to form a single unit suitable for transmitting and receiving data and/or voice communications in an integrated package. In either case, remote unit 100 can be used to transmit data from the data-generating device to one or more net members, or to one or more non-net members.

When used as a voice communication device, a net member uses keys 220 to enter data into remote unit 100, the data typically comprising an identification number, such as a telephone number, of a second communication device belonging to a person whom the net member wishes to communicate. Keys 220 are also used in conjunction with display 210 to choose various communication options. For example, if a member wishes to communicate with all members of the net, keys 220 can be used to select such an option from a menu of options viewable from display 210. Keys 220 may also be used to select a sub-set of net members, instead of all net members, with whom the net member wishes to communicate. Other operational functions of remote unit 100 may be accessed by using keys 220 in conjunction with display 210, such as the volume at which earpiece 240 operates, the storage and retrieval of information, such as member names and associated telephone numbers, or various information regarding past communications placed or received by remote unit 100.

When a net member wishes to transmit voice or data to other net members, permission must first be sought by the member and granted by arbitration device 150 before transmissions are allowed to take place. The member generally requests permission to transmit, otherwise known as a transmission request, by depressing a push-to-talk (PTT) button or switch 250 located on remote unit 100. Upon pressing PTT switch 250, remote unit 100 generates the transmission request, which is transmitted ultimately to arbitration device 150, discussed later herein. If no other net member holds the transmission privilege, permission to transmit is granted by the arbitration device, and the requesting net member is permitted to begin transmitting voice and/or data to other net members or non-net members, depending on who the transmitting net member has chosen to communicate with. If another net member presently holds the transmission privilege when the talk request signal is received by arbitration device 150, the transmission privilege is generally denied to the requesting member, unless, for instance, the requesting member has a higher priority than the member currently holding the transmission privilege.

A time lapse occurs between when a member presses PTT switch 250 and when the transmission request is received by arbitration device 150. This may be due to several factors, including the distance that remote unit 100 is from arbitration device 150 and the number of electronic circuits the transmission request must travel through to get to arbitration device 150. For example, in a wireless terrestrial communication system, a small amount of delay can be attributed to the time it takes the transmission request to travel from remote unit 100 over the air to base station 100a. The transmission request is then downconverted and demodulated, then sent to MSC 120, where it is routed to PSTN 130, and finally to arbitration device 150 located within communication manager 140. The transmission request may have been delayed by as much as 500 milliseconds or more by the time it has been received by arbitration device 150.

In another example, remote unit 104 is a satellite communication device located many thousands of miles away from arbitration device 150. When remote unit 104 sends a transmission request, it is transmitted from remote device 104 to satellite 108, which is generally many hundreds or even thousands of miles above the earth. By the time the transmission request from remote unit 104 is received by gateway 112, a time delay in the order of 250 milliseconds may result. From gateway 112, the transmission request must be routed to the PSTN proximate to gateway 112, then routed generally by electrical or fiber optic cables to PSTN 114, which may be thousands of miles away, resulting in another delay on the order of 100 milliseconds. Finally, the transmission request is received by arbitration device 150 after a relatively lengthy delay from when PTT switch 250 was pressed on remote unit 104.

In yet another example, remote unit 106 is a data communication device connected to data network 160. Generally, remote unit 106 is again located a large distance away from arbitration device 150. When remote unit 106 sends a transmission request, it must be routed through many computer networks which comprise data network 160. Often, data network 160 becomes overloaded with a tremendous volume of data, greatly delaying data as it is routed to its intended destination. In this case, a transmission request from remote unit 106 may be delayed by hundreds of milliseconds or more before it reaches arbitration device 150.

The delays just discussed have an unwanted effect on a broadcast system as described in FIG. 1. Arbitration device 150 generally grants the exclusive transmission privilege on a "first come, first served" basis. Therefore, net members who experience consistent delays in having their transmission requests routed to arbitration device 150 in a timely manner are penalized by constantly being denied the transmission privilege. Therefore, the result of arbitration device 150 receiving delayed transmission requests from certain net members is to favor members having little or no delays associated with transmission requests, while discriminating against those members having relatively large delays associated with transmission requests. This problem is solved by the present invention at arbitration device 150, as explained below.

Figure 3:
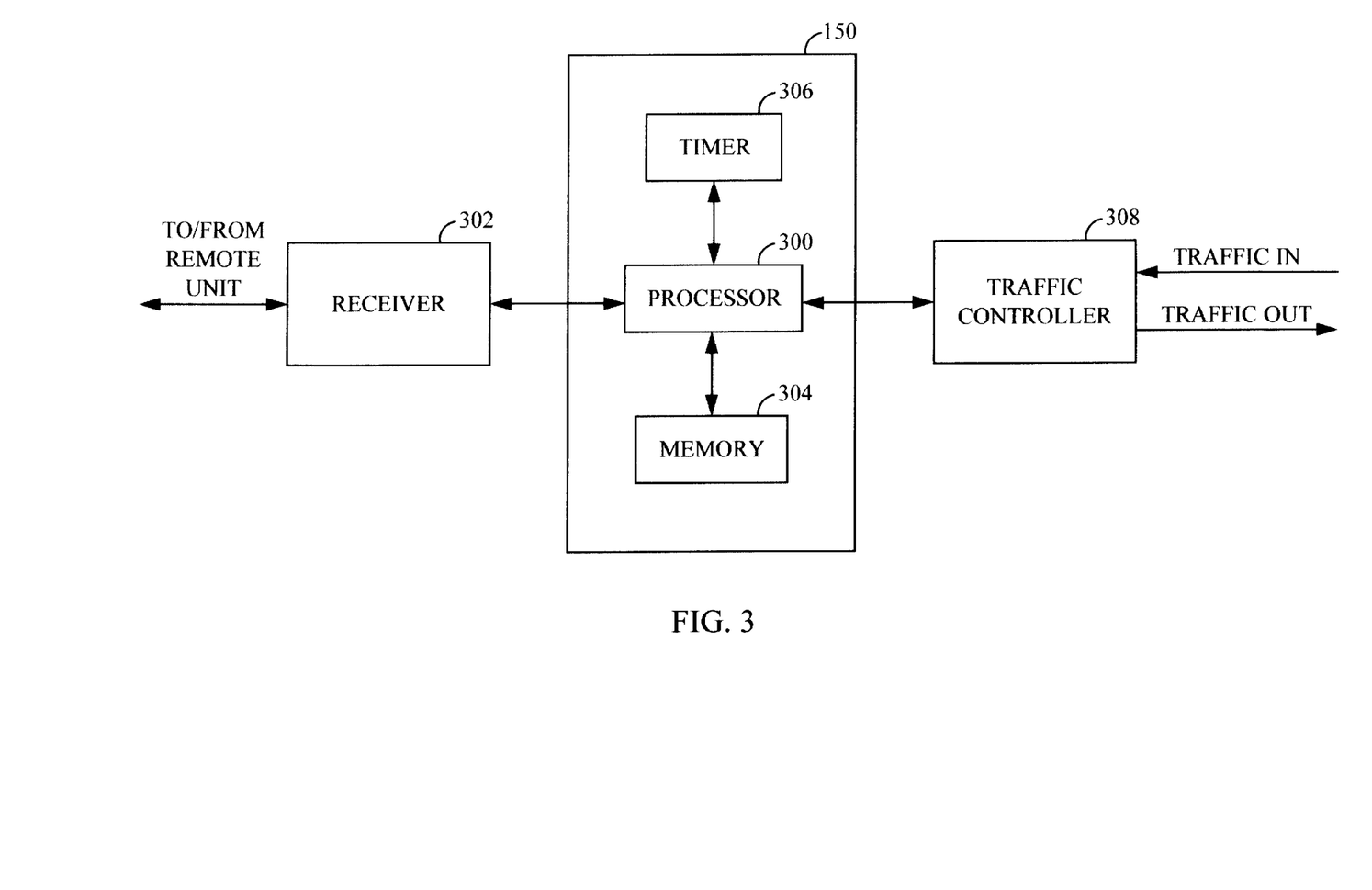
FIG. 3 illustrates the functional components of an arbitration device and a traffic controller used in the group system of FIG. 1.

FIG. 3 illustrates the functional components of arbitration device 150 and traffic controller 308. Processor 300 receives transmission requests from remote units in the push-to-talk system. Processor 300 is generally a digital computational device, such as a personal computer, a mainframe computer, or simply a microprocessor, for example, any one of the 80×86 microprocessors from Intel Corporation of Santa Clara, Calif.

The transmission requests contain at least information identifying the remote unit from which the request originated. Other information may be transmitted along with the transmission request as well, including the date and time the request was transmitted, the location of the remote unit when the request was made, to whom the present communication is directed to, or a present priority level assigned to the remote unit. Transmission requests may be transmitted by remote units in the communication system using a control channel, a paging channel, a traffic channel, or by any means generally known in the art for transmitting messages. The present invention, therefore, is not limited by the method that transmission requests are delivered to processor 300.

Transmission requests are received by receiver 302 using techniques well known in the art, and provided to processor 300. Processor 300 extracts information relating to each transmission request and stores it in memory 304. Such information includes information identifying the member which sent the transmission request. Other information contained within the transmission request may optionally be stored as well, for example, the time that each transmission request was received.

In addition to storing information relating to each transmission request, processor 300 opens a time window, having a start time substantially equal to the time at which an initial transmission request was received. Timer 306 is used to determine the time that the initial transmission request was received and when a time window has expired. Expiration of the time window can be accomplished in many ways. In the preferred embodiment, processor 300 provides timer 306 with a signal when an initial transmission request has been received. Timer 306 then begins tracking the elapsed time from the signal provided by processor 300. When the elapsed time is equal to the predetermined time window duration, timer 306 sends a signal to processor 300 indicating that the time window has closed. Timer 306 can be implemented using well known hardware or software techniques, and can be integrated within processor 300 if desired.

If the time window has not expired, information relating to each transmission request received by arbitration device 150 after the initial transmission request is stored in memory 304. When the time window expires, processor 300 evaluates all transmission requests received within the time window as if they were received at the same time. Optionally, when the time window closes, processor 300 determines if any other member currently holds the transmission privilege. If so, there is no need for processor 300 to evaluate the transmission requests received within the time window, because, in the preferred embodiment, the transmission privilege cannot be given to any other member if another member currently holds the transmission privilege. In another embodiment, a priority scheme is used to determine if the transmission privilege should be given to a requesting member, even though the transmission privilege is presently held by another member at the time the transmission request is received by arbitration device 150.

If no other member currently holds the transmission privilege, processor 300 then grants the transmission privilege to a member corresponding to one of the transmission requests stored in memory 304 using a predetermined method, such as comparing priority levels corresponding to each transmission request. After a member has been chosen to receive the transmission privilege, processor 300 first determines whether or not another member currently holds the transmission privilege. If not, the selected member is granted the transmission privilege, generally by sending a conformation message to the selected member, and the other competing members are denied the privilege. A denial message may optionally be sent to those members. Processor 300 then resumes waiting for an initial transmission request. If another member currently holds the transmission privilege, all transmission requests are denied, and processor 300 resumes waiting for an initial transmission request.

The time window is used to equalize the effects of delayed transmission requests by allowing any transmission request received within the time window to be including in determining which member should be granted the exclusive transmission privilege. Thus, transmission requests which are received at a relatively long time from when an initial transmission request was received will be treated as if they were received at the same time as the initial transmission request.

In a preferred embodiment, the duration of the time window is a predetermined, fixed value, on the order of 100 to 150 milliseconds. Of course, in other embodiments, the time window could have a greater or smaller value. In another embodiment, the time window comprises a variable duration time, dependent upon one or more events or circumstances. For example, if arbitration device 150 determines that a remote unit is located a great distance away, it would be desirable to increase the time window duration so that such members could more equally compete with local members in obtaining the transmission privilege. Such location information may be contained within the transmission request, as previously discussed.

When the transmission privilege is granted to a member, in addition to a confirmation message, processor 300 sends one or more commands or control signals to traffic controller 308, directing it to route the requesting member's incoming transmissions to other members of the broadcast system. Traffic controller 308 has the capability to connect the transmission from any one member of the broadcast system to one or more other members of the broadcast system, depending on the commands or signals received from processor 300. Traffic controller 308 is well known in the art and can be a well known circuit switch or a processor for providing packet data switching between members.

Figure 4A:
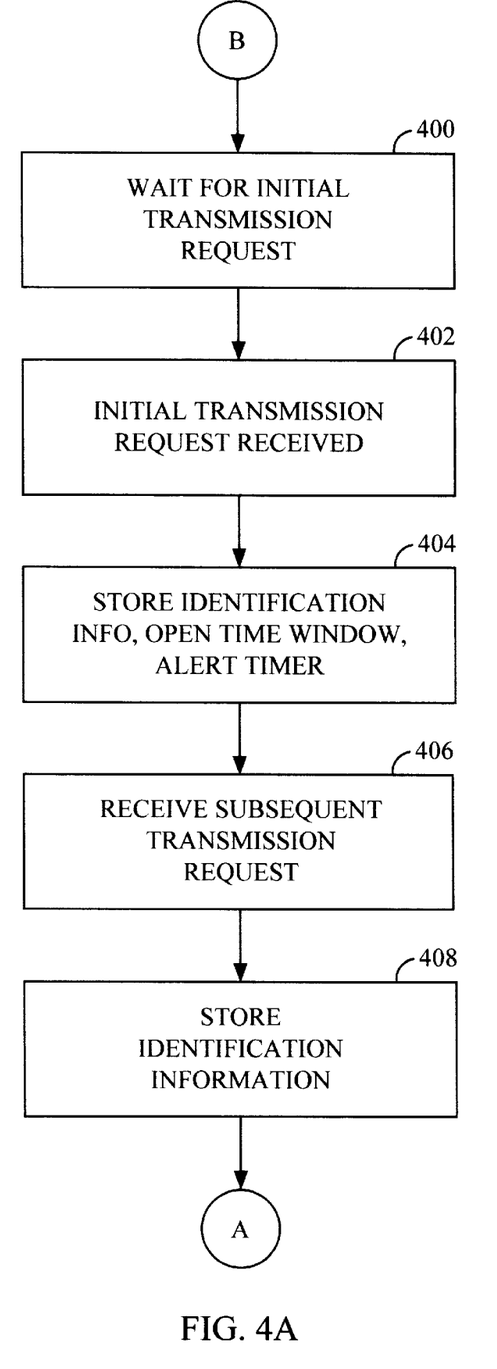
FIGS. 4a and 4b illustrate a flow diagram detailing the method of the present invention.
Figure 4B:
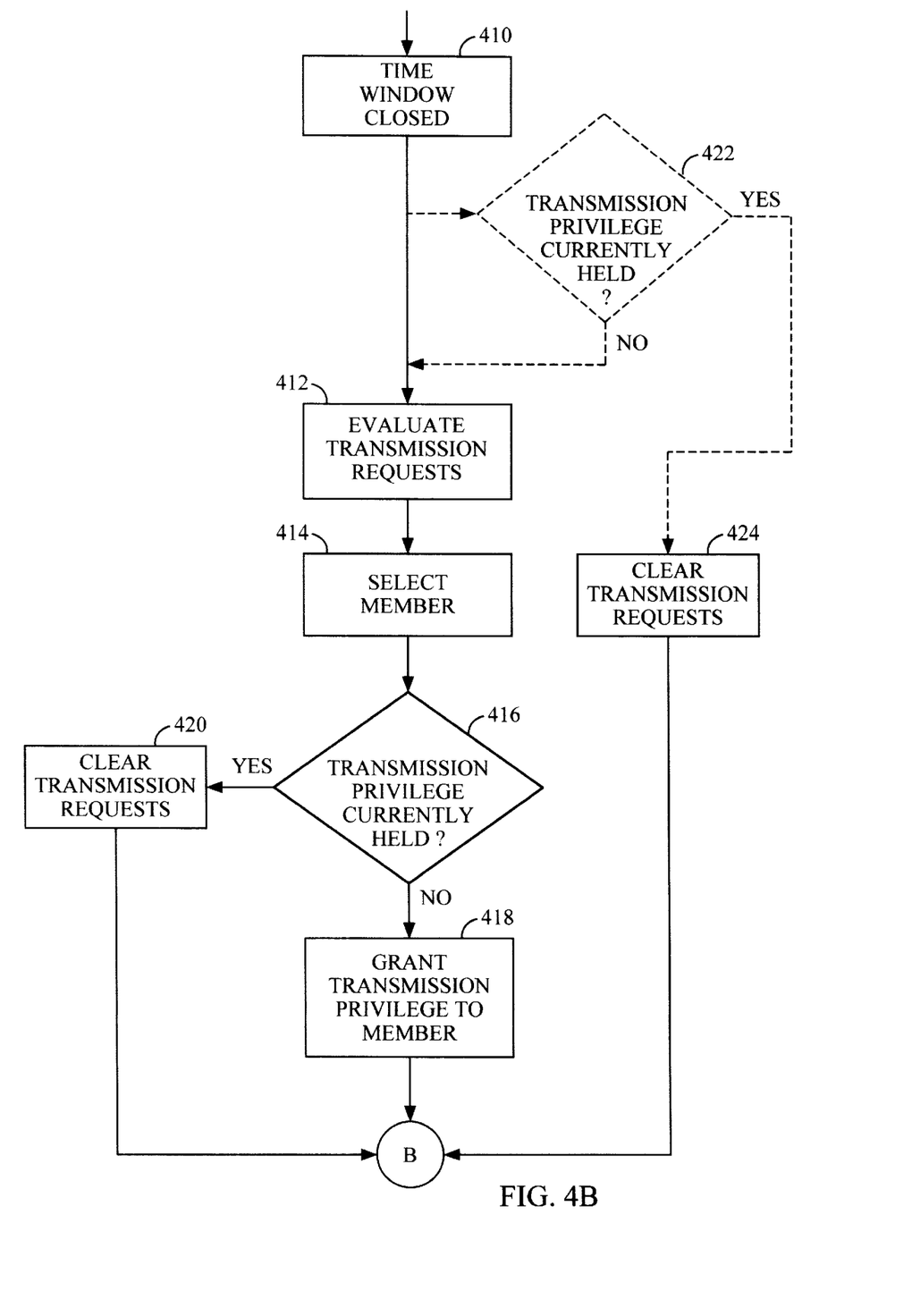

FIGS. 4*a* and 4*b* illustrate a flowchart which details the method of the present invention. The method begins with step 400, in which processor 300 waits to receive an initial transmission request from a member of the group communication system. In step 402, processor 300 receives an initial transmission request from a first member of the communication system. In step 404, processor 300 stores at least identification information corresponding to the first member in memory 304. The identification information is generally contained within the initial transmission request, but could also be contained in a later transmission from the first member. Processor 300 also opens a time window in step 404 having a start time substantially equal to the time at which the initial transmission request was received. Finally in step 404, processor 300 alerts timer 306 to begin counting the elapsed time from the time that the initial transmission request was received.

In step 406, processor 300 receives a subsequent transmission request from a second member of the communication system, prior to expiration of the time window. In step 408, processor 300 stores at least identification information corresponding to the second member in memory 304.

In step 410, timer 306 determines that the time window has closed by comparing the elapsed time since reception of the initial transmission request to the predetermined time window duration. When the elapsed time is equal to the time window duration, timer 306 sends a signal to processor 300 indicating that the time window has closed.

Optionally, flow continues to step 422 to determine if the transmission privilege is currently held by another member. If so, the transmission requests received within the time window do not need to be evaluated, because no member may be granted the transmission privilege if another member already holds the privilege, unless some other provision for granting the transmission privilege is in effect, such as a priority scheme in use by arbitration device 150. In that case, flow continues to step 424, where processor 300 clears the information relating to any transmission requests received during the previous time window in memory 304. Processor 300 then resumes waiting for the next initial transmission request in step 400. If the transmission privilege is not currently held by another member as determined in step 422, flow continues to step 412, as described below.

In step 412, processor 300 includes any transmission requests that have occurred within the time window in determining which member should be granted the transmission privilege. The selection can be done in any manner generally known to those skilled in the art.

In step 414, a member corresponding to one of the transmission requests received within the time window is selected by processor 300 to receive the transmission privilege. However, before this is done, processor 300 first determines whether or not another member currently holds the transmission privilege, shown in FIG. 4*b* as step 416. If no other member currently holds the transmission privilege, the selected member is granted the transmission privilege, shown as step 418, generally by sending a conformation message to the selected member, and the other competing members are denied the privilege. A denial message may optionally be sent to those members. Processor 300 then resumes waiting for the next initial transmission request in step 400. If another member currently holds the transmission privilege, all transmission requests are denied, and processor 300 clears any information stored in memory 304 relating to the transmission requests received during the time window in step 420, unless a priority scheme or other method to award the transmission privilege is being used. Processor 300 may optionally send a denial message to the remote units who sent a transmission request during the previous time window at this time. Processor 300 then resumes waiting for the next initial transmission request in step 400.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. Method for providing fair access to members of a group communication system in which members experience differing signaling delays, comprising the steps of:

receiving an initial transmission request from a first member by an arbitration device;

opening a time window in response to said initial transmission request;

receiving a second transmission request from a second member by said arbitration device;

determining whether or not said second transmission request was received within said time window; and including said initial transmission request and said second transmission request in determining which member should be granted an exclusive transmission privilege if said second transmission request was received within said time window.

2. Method of claim 1 wherein the step of receiving a first transmission request comprises the step of storing identification information corresponding to said first member.

3. Method of claim 1 wherein the step of receiving a second transmission request comprises the step of storing identification information corresponding to said second member.

4. Method of claim 1 wherein the step of determining whether or not said second transmission request was received within said time window comprises the steps of:

determining whether or not said time window has closed; and storing information relating to said second member if said time window has not closed.

5. Apparatus for providing fair access to members of a group communication system in which members experience differing signaling delays, comprising:

a receiver for receiving an initial transmission request from a first member and a second transmission request from a second member;

a memory for storing information relating to said initial transmission request and said second transmission request;

a timer for determining when a time window has closed; and a processor connected to said receiver, to said memory, and to said timer for including said initial transmission request and said second transmission request in determining which member should be granted an exclusive transmission privilege, if said second transmission request is received within said time window.

6. Apparatus of claim 5 wherein said information comprises identification information relating to said first member and said second member.

* * * * *